United States Patent [19]

Bonicel et al.

[11] Patent Number: 4,790,626

[45] Date of Patent: Dec. 13, 1988

[54] CONNECTION BETWEEN AN OPTICAL FIBER CABLE AND A JUNCTION BOX

[75] Inventors: Jean-Pierre Bonicel; Gérard Couvrié, both of Lyons, France

[73] Assignee: Les Cables De Lyon, Clichy, France

[21] Appl. No.: 105,364

[22] Filed: Oct. 7, 1987

Related U.S. Application Data

[63] Continuation-in-part of Ser. No. 814,124, Dec. 27, 1985, abandoned.

[30] Foreign Application Priority Data

Dec. 28, 1984 [FR] France ................................. 84 20044

[51] Int. Cl.⁴ .............................................. G02B 6/36
[52] U.S. Cl. ................... 350/96.20; 174/79; 403/209; 403/268
[58] Field of Search .............. 350/96.20, 96.21, 96.22; 174/79; 403/206, 209, 213, 268

[56] References Cited

U.S. PATENT DOCUMENTS

| | | | |
|---|---|---|---|
| 2,266,357 | 12/1941 | Cooke | 403/268 X |
| 4,217,028 | 8/1980 | Reh et al. | 350/96.20 |
| 4,516,830 | 5/1985 | Guazzo | 350/96.22 |
| 4,595,256 | 6/1986 | Guazzo | 350/96.21 |
| 4,601,536 | 7/1986 | Guazzo | 350/96.20 |
| 4,674,832 | 6/1987 | Hirai et al. | 350/96.21 |
| 4,701,014 | 10/1987 | Bonicel | 350/96.20 |

FOREIGN PATENT DOCUMENTS

59-74516   4/1984   Japan ................................. 350/96.20

Primary Examiner—John D. Lee
Attorney, Agent, or Firm—Sughrue, Mion, Zinn, Macpeak & Seas

[57] ABSTRACT

The end (2) of an axial strength member is curved into a swan-neck (3) and gripped in a cold polymerized resin (4) which fills a cavity of a chamber (5) that is fixed relative to the junction box (6).

1 Claim, 1 Drawing Sheet

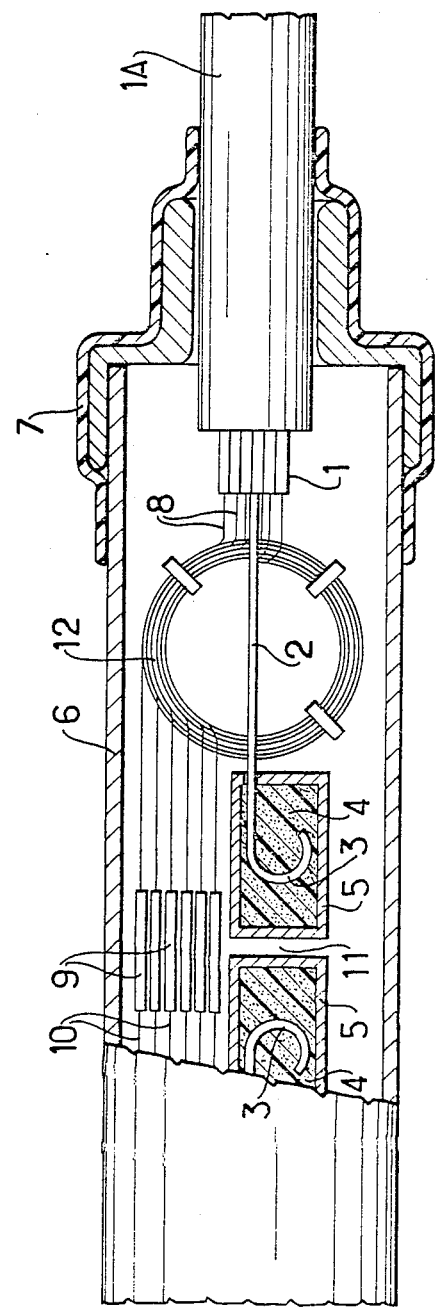

CONNECTION BETWEEN AN OPTICAL FIBER CABLE AND A JUNCTION BOX

This application is a continuation-in-part application of application Ser. No. 814,124 filed Dec. 27, 1985, now abandoned.

The present invention relates to a connection between a junction box and an optical fiber cable having a non-metallic axial strength member, for example guard cables for high tension lines.

BACKGROUND OF THE INVENTION

Proposals have already been made in U.S. Pat. No. 4,595,256 of Lucien GUAZZO for a junction between the ends of two underwater optical fiber cables, each cable having an optical core, an arch of steel wire, a copper tube swaged down on the arch, an insulating sheath, a return conductor, and a protective sheath.

The junction comprises two cable-receiving end portions, a wedge member for splaying out the steel wire, and a filling of hardenable resin in which the ends of the steel wires are glued, where they are jammed between the cable-receiving end portions and the conical wedge members.

However, such a junction is relatively complex and is not well suited for connecting cable having a non-metallic axial strength member, and in particular for guard cables of tubular structure or having a central core fitted with optical fiber receiving grooves, and having an axial strength member made of composite material (glass fibers/epoxy resin, glass fibers/polyester resin, aromatic polyamide fibers/polyester resin) or a braid of high-strength non-metallic fibers (carbon fibers). The ends of such cables must be firmly gripped in a junction box and they must be capable of withstanding forces corresponding to an elongation of at least 0.8% without breaking or sliding.

Preferred implementations of the present invention provide a connection which provides excellent gripping between the end of a cable and a junction box, and it allows said cable end to withstand forces corresponding to an elongation of at least 0.8% without breaking or sliding, while being simple in structure and easy to implement.

SUMMARY OF THE INVENTION

The present invention provides a connection between an optical fiber cable having a non-metallic axial strength member and a junction box, the end of the axial strength member being curved into a swan-neck and gripped in cold polymerized resin which fills a cavity fixed relative to said box.

BRIEF DESCRIPTION OF THE DRAWING

An embodiment of the invention is described by way of example with reference to the sole FIGURE of the accompanying drawing, which shows a section through a connection between a junction box and an underwater cable having a grooved central core of plastic material and a glass fiber/epoxy resin composite strength member.

MORE DETAILED DESCRIPTION

The central core 1 of cable 1A has an axial strength member 2 which terminates in a swan-neck shape 3 which is embedded in a mass of epoxy resin 4 disposed in a cavity of a chamber 5 which is fixed relative to junction box 6. A thermoretracting sheath 7 encloses the respective ends of cable 1A and junction box 6. The optical fibers 8 are directed away from the central core prior to the core entering the cavity. The optical fibers are connected by connections 9 to other optical fibers 10 taken from the end of another cable in optical fiber connection cavity 11 provided within the junction box. Excess lengths 12 of the fibers are stored in several turns 12, in conventional manner, within the junction box, in a manner analogous to that described in U.S. Pat. No. 4,595,256.

Breaking and sliding tests have been performed on a core of plastic material having a resin/glass-fiber composite axial strength member disposed vertically and gripped at each end by a swan-neck in a box or chamber 5 filled with cold polymerized epoxy resin. The bottom box was subjected to traction suitable for elongating the core by 1%. No breakage or sliding was observed after an observation period of two months had elapsed.

Comparative traction strength tests were also performed on 200 mm long strength members having a 140 mm length at each end embedded in epoxy resin filling a cavity, and these tests were performed on strength members having rectilinear end lengths and on strength members having their end lengths in a swan-neck curve. A first series of tests was performed using a glass fiber/epoxy resin composite strength member including 0.9 mm diameter fibers sold under the name "Grillo ZEV". The breaking strength Rr (in daN), the elongation on breaking Ar (in %), and the breaking strength per unit cross sectional area TR (in megapascals) were measured. The results of these tests are summarized in table I and II below:

TABLE I

| Core having a swan-neck end | | | | | | |
|---|---|---|---|---|---|---|
| | Test 1 | 2 | 3 | 4 | 5 | Average |
| Rr (daN) | 80.2 | 73.5 | 78.2 | 82 | 77.5 | 78.3 |
| Ar (%) | 4.73 | | | 5 | | 4.86 |
| TR (MPa) | 1237 | 1133 | 1206 | 1264 | 1195 | 1027 |

Rr of the strength member as specified by the manufacturer: 81 daN

TABLE II

| Core having rectilinear end without a swan neck | | | | | | |
|---|---|---|---|---|---|---|
| | Test 1 | 2 | 3 | 4 | 5 | Average |
| Rr (daN) | 58.8 | 61 | 71 | 64.6 | 66 | 64.3 |
| Ar (%) | | numerous slips prior to rupture | | | | |
| TR (MPa) | 907 | 941 | 1095 | 996 | 1018 | 991 |

Manufacturer's Rr: 81 daN

A second set of similar comparative tests were performed on a glass fiber/epoxy resin composite strength member using 0.75 mm diameter glass fibers sold under the name "Neptco LLE".

The results of these tests are summarized in Tables III and IV below;

TABLE III

| Core having a swan-neck end | | | | | | |
|---|---|---|---|---|---|---|
| | Test 1 | 2 | 3 | 4 | 5 | Average |
| Rr (daN) | 64 | 64.6 | 62 | 54 | 56 | 60.1 |
| Ar (%) | | | | slipping | | |
| TR (MPa) | 1421 | 1434 | 1378 | 1199 | 1243 | 1355 |

Manufacturer's Rr: 64.7 daN

TABLE IV

| Core having rectilinear end without a swan neck | | | | | | |
| --- | --- | --- | --- | --- | --- | --- |
| | Test 1 | 2 | 3 | 4 | 5 | Average |
| Rr (daN) | 47.2 | 35 | 59.4 | 63.4 | 29.8 | 47.0 |
| Ar (%) | | | | slipping | | |
| TR (MPa) | 1048 | 777 | 1319 | 1408 | 662 | 1043 |

Manufacturer's Rr: 64.7 daN

It can thus be seen with both cores that the presence of a swan-neck at the end considerably increases the tensile strength and tends to reduce slipping at the end of the core under tension.

What is claimed is:

1. A connection for connecting the ends of optical fiber cables within a junction box, said cables having a non-metallic axial strength member and a central core containing a plurality of optical fibers, said connection comprising:

(a) an optical fiber connection cavity within said junction box for storing excess lengths of said optical fibers,
   (b) means for directing away the optical fibers from the ends of said central cores at the inlet of said connection cavity,
   (c) means for connecting together the ends of the optical fibers of the said cables within said optical fiber connection cavity,
   (d) said non-metallic axial strength members having swan-like curved ends, protruding into said optical fiber connection cavity, and
   (e) chambers forming gripping cavities filled with a cold polymerized resin, said chambers being fixed within said optical fiber connection cavity and receiving, respectively, said swan-like curved ends which ends are enclosed in said cold polymerized resin.

* * * * *